US011733858B2

United States Patent
Futatsumori et al.

(10) Patent No.: US 11,733,858 B2
(45) Date of Patent: Aug. 22, 2023

(54) IMAGE FORMING APPARATUS THAT RECEIVES FUNCTION RESTRICTION INFORMATION FROM A MANAGEMENT APPARATUS, IMAGE FORMING SYSTEM AND METHOD FOR CONTROLLING IMAGE FORMING APPARATUS

(71) Applicant: Canon Kabushiki Kaisha, Tokyo (JP)

(72) Inventors: Yuki Futatsumori, Kanagawa (JP); Moritaka Iwakoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/547,636

(22) Filed: Dec. 10, 2021

(65) Prior Publication Data

US 2022/0187970 A1    Jun. 16, 2022

(30) Foreign Application Priority Data

Dec. 11, 2020    (JP) ................. 2020-206042

(51) Int. Cl.
*G06F 3/0488* (2022.01)
*G06F 9/451* (2018.01)

(52) U.S. Cl.
CPC ........... *G06F 3/0488* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2016/0231686 A1* | 8/2016 | Itoh | G03G 15/502 |
| 2017/0075635 A1* | 3/2017 | Maemura | G06F 3/1285 |
| 2020/0184116 A1* | 6/2020 | Ishihara | G06F 21/84 |

FOREIGN PATENT DOCUMENTS

| | | | |
|---|---|---|---|
| JP | 2006222636 A | 8/2006 | |
| JP | 2007122366 A | 5/2007 | |

* cited by examiner

*Primary Examiner* — Andrew H Lam
(74) *Attorney, Agent, or Firm* — Venable LLP (57) ABSTRACT

An image forming apparatus operable to provide at least one function is provided. The apparatus comprises an operation unit configured to accept an operation by a user via a displayed user interface; and a controller that, based on function restriction information indicating availability of each of the at least one function, displays, on the operation unit, a user interface that accepts an instruction for using a function for which usage is permitted and does not accept an instruction for using a function for which usage is restricted.

10 Claims, 11 Drawing Sheets

| | PRINT | COPY | SCAN | |
|---|---|---|---|---|
| USER A | ○ | ○ | ○ | 204 |
| USER B | × | ○ | × | |
| ⋮ | ⋮ | ⋮ | ⋮ | |

FIG. 12 ately user is permitted to use can be used. For example, in# IMAGE FORMING APPARATUS THAT RECEIVES FUNCTION RESTRICTION INFORMATION FROM A MANAGEMENT APPARATUS, IMAGE FORMING SYSTEM AND METHOD FOR CONTROLLING IMAGE FORMING APPARATUS

BACKGROUND OF THE INVENTION

Field of the Invention

The present invention relates to an image forming apparatus, an image forming system, and a method for controlling an image forming apparatus.

Description of the Related Art

Image forming apparatuses are known to be equipped with an authentication function using an ID card or the like and to have a function for changing which functions to restrict for each user so that only functions that an authenticated user is permitted to use can be used. For example, in Japanese Patent Laid-Open No. 2007-122366, based on specific use restriction information and user registration information, use restriction information corresponding to a network support apparatus to be set is created. In Japanese Patent Laid-Open No. 2006-222636, a user ID and password inputted when transmitting a scanned image are associated with use restriction information stored in a server, and use permission and use restriction are performed based on collation.

However, in the prior art, user authentication is performed using an authentication function such as an ID card, and the functions that a user is permitted to use are made available in accordance with user information stored in an image forming apparatus or an external user management server. In such a case, it is necessary to have a user management function in the image forming apparatus, or it is necessary for the image forming apparatus to receive and control user information that was is authenticated externally, and there is a problem in that hardware resources and development costs are required for the image forming apparatus.

SUMMARY OF THE INVENTION

The present invention has been made in view of the above-mentioned conventional example, and realizes management of functions for each user with a simple configuration.

The present invention has the following configurations. That is, according to one aspect of the present invention, there is provided an image forming apparatus operable to provide at least one function, the apparatus comprising: an operation unit configured to accept an operation by a user via a displayed user interface; and a controller, wherein the controller comprises one or more processors and one or more memory comprising one or more programs, wherein the one or more programs are configured to cause the one or more processors to: based on function restriction information indicating availability of each of the at least one function, display, on the operation unit, a user interface that accepts an instruction for using a function for which usage is permitted and does not accept an instruction for using a function for which usage is restricted.

According to another aspect of the invention, there is provided an image forming system comprising: an image forming apparatus operable to provide at least one function; and an external apparatus configured to transmit to the image forming apparatus the function restriction information corresponding to an authenticated user, wherein the image forming apparatus comprises: an operation unit configured to accept an operation by a user via a displayed user interface; and a controller, wherein the controller comprises one or more processors and one or more memory comprising one or more programs, wherein the one or more programs are configured to cause the one or more processors to: based on function restriction information indicating availability of each of the at least one function, display, on the operation unit, a user interface that accepts an instruction for using a function for which usage is permitted and does not accept an instruction for using a function for which usage is restricted.

According to the present invention, it is possible to realize management of functions for each user with a simple configuration.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached draw-

First Embodiment

System and Apparatus Configuration

Figure 1:
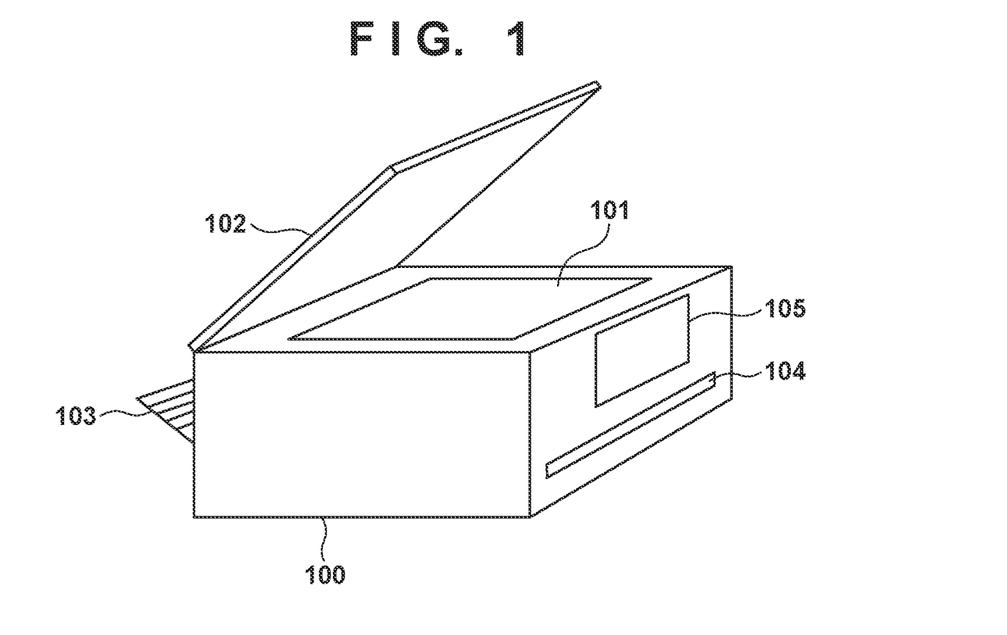
FIG. 1 is a diagram illustrating an appearance of an image forming apparatus 100.

FIG. 1 is a diagram illustrating an appearance of an image forming apparatus 100. In the present embodiment, the image forming apparatus 100 is given as an example of an image forming apparatus (Multi Function Printer) (MFP: also referred to as multifunction peripheral). In FIG. 1, an original table 101 is a transparent glass table, and is used when a document is placed thereon and read by a scanner. An original cover 102 is a cover for preventing a scanning light from leaking to the outside when reading is performed by the scanner. A sheet feeding cassette 103 is an insertion opening for setting sheets of various sizes. The sheets set in the sheet feeding cassette 103 are conveyed one by one to the printing unit, and the printed sheets are discharged from a discharge tray 104. Although FIG. 1 illustrates an apparatus in which one paper feed cassette is mounted as an example, any number of paper feed cassettes may be used as long as one or more paper feed cassettes are used.

Figure 2:
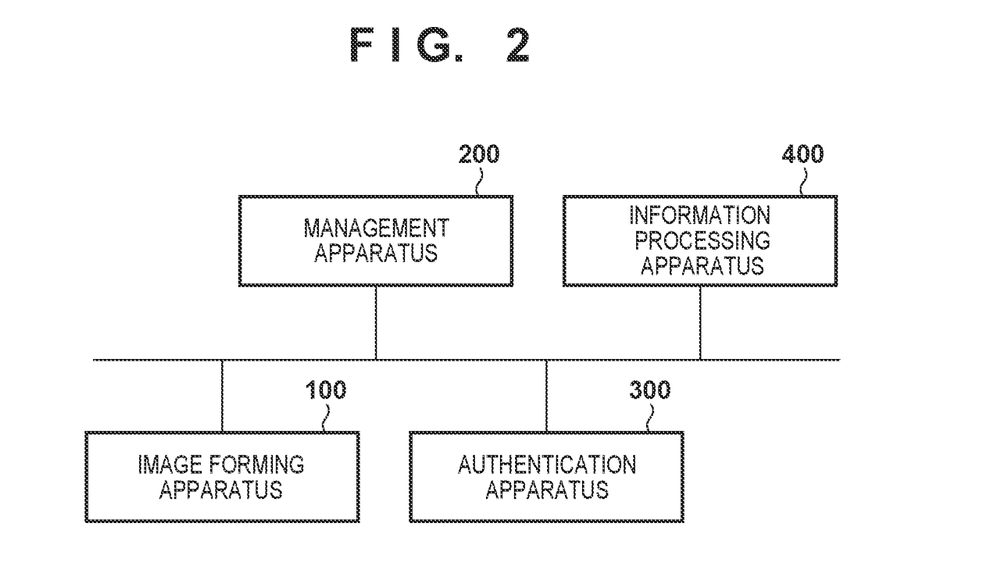
FIG. 2 is a diagram illustrating an apparatus configuration described in a first embodiment.

Next, a configuration of the image forming apparatus 100 and peripheral apparatuses thereof in the present embodiment will be described. FIG. 2 illustrates a configuration of a management system (or an image forming system) of the image forming apparatus 100 according to the present embodiment. In this management system, the image forming apparatus 100 and external apparatuses, for example, a management apparatus 200, an authentication apparatus 300, and an information processing apparatus 400 are connected via a communication network.

Figure 3:
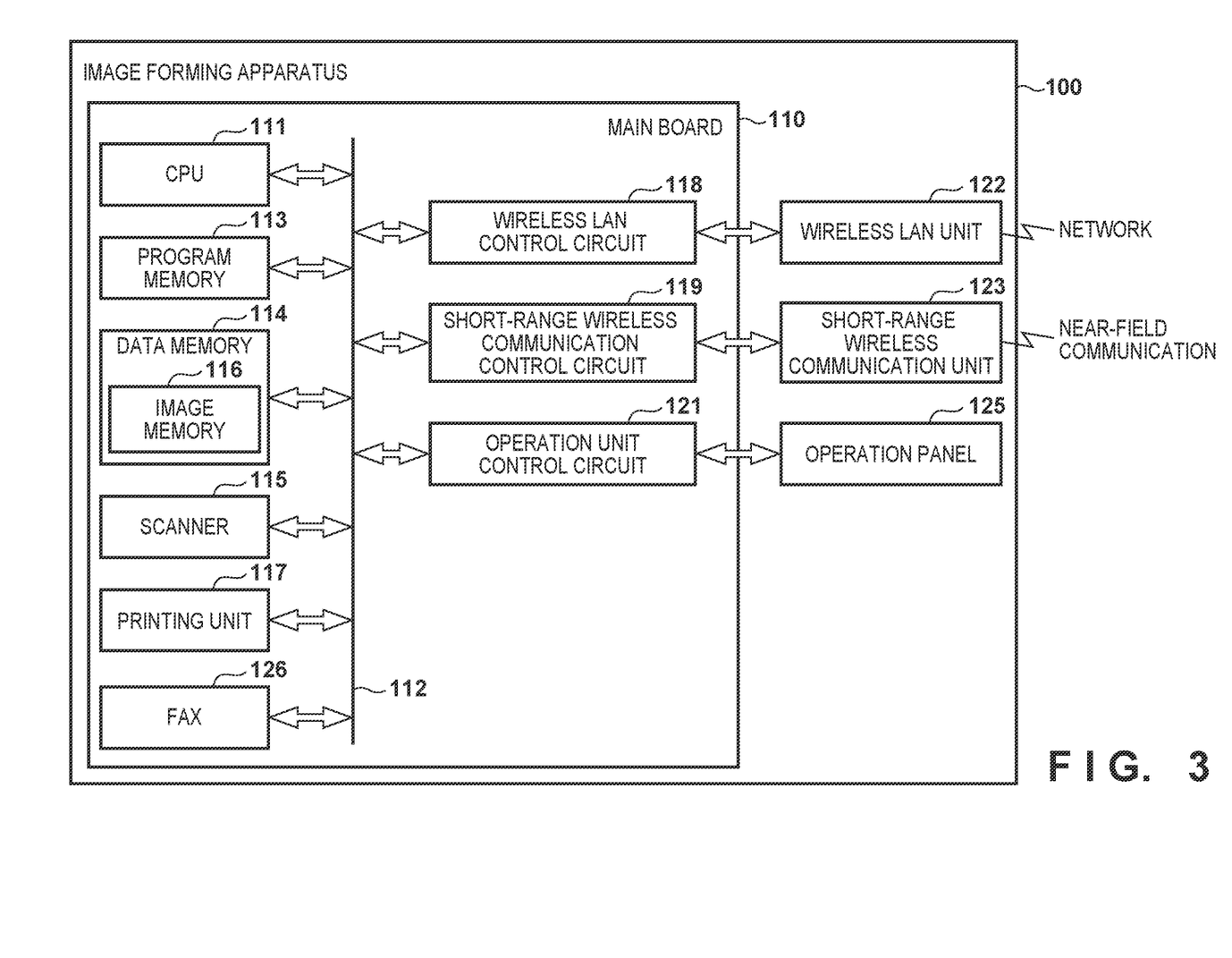
FIG. 3 is a block diagram illustrating a configuration of a control system of the image forming apparatus 100.

FIG. 3 is a block diagram illustrating a configuration of a control system of the image forming apparatus 100 according to the present embodiment. A CPU 111 in the form of a microprocessor operates in accordance with a program memory 113 in the form of a ROM connected via an internal bus and a data memory 114 in the form of a RAM connected via an internal bus. The data memory 114 is used for the purpose of a work memory used by the CPU 111 when executing a control program and an image memory 116 for storing image data formed on a print sheet. The CPU 111 controls a wireless LAN control circuit 118 and a short-range wireless communication control circuit 119, and can communicate with other apparatuses connected via external interfaces (communication network). The CPU 111 can accordingly receive print job data from the management apparatus 200 or notify the management apparatus 200 of the status of the image forming apparatus 100. The CPU 111 controls an operation panel 125 provided on the outer surface of the printing apparatus 100 via an operation unit control circuit 121. The operation panel 125 accepts an operation by an operator and provides a user interface for presenting information to an operator.

Figure 4:
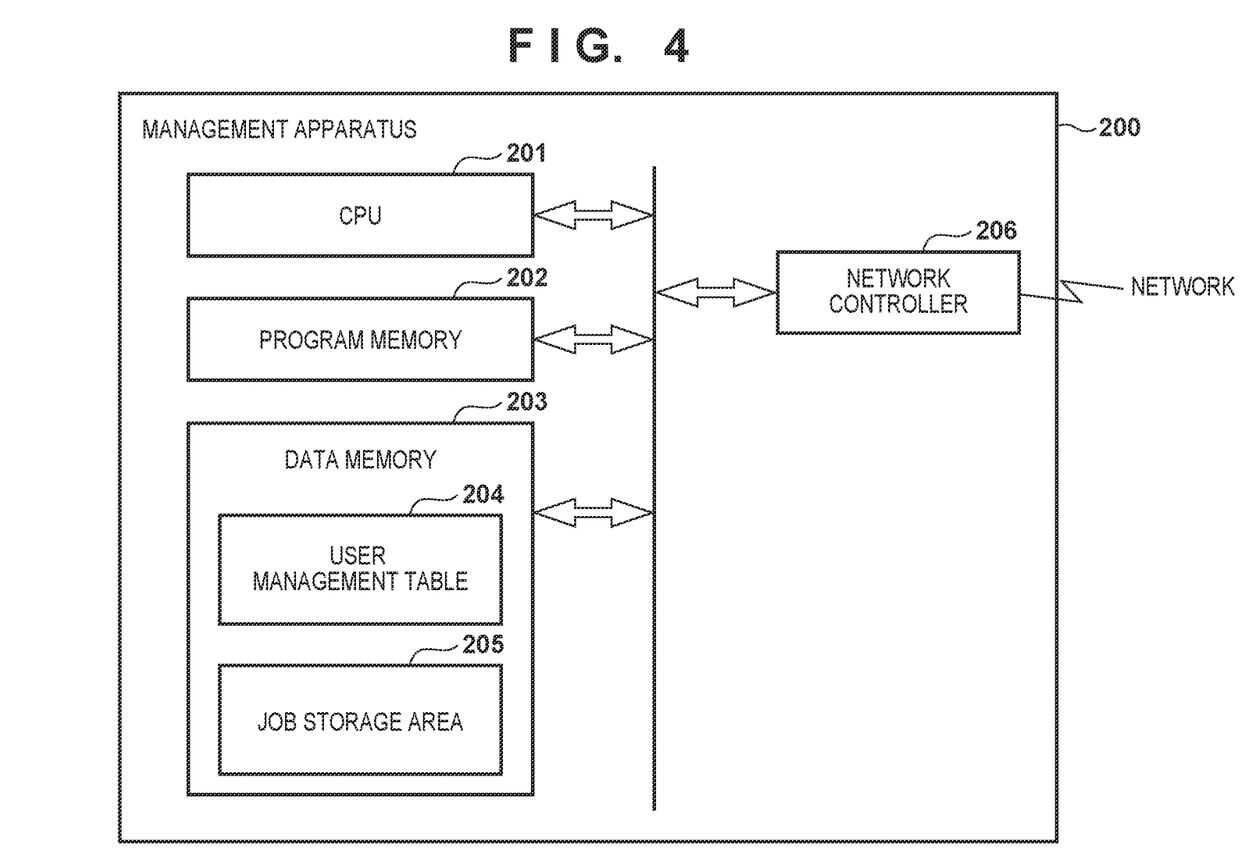
FIG. 4 is a block diagram illustrating a configuration of a control system of a management apparatus 200.
Figure 5:
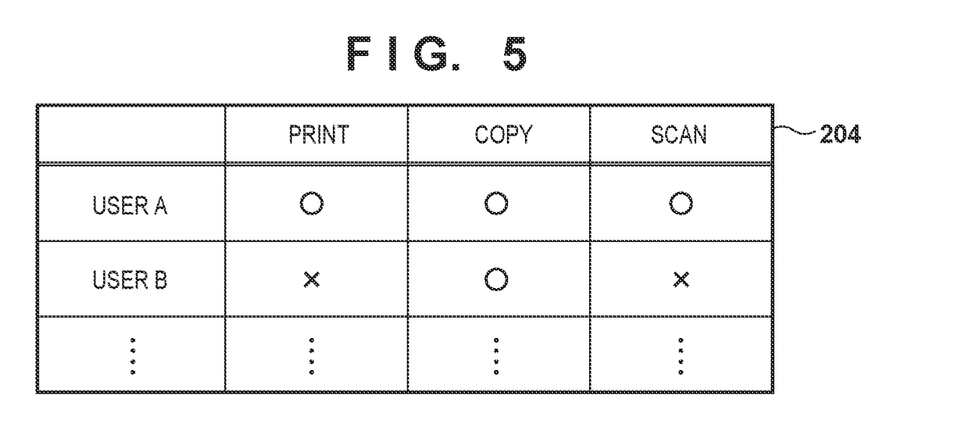
FIG. 5 is a diagram illustrating a user management table illustrated in the first embodiment.

FIG. 4 is a block diagram illustrating a configuration of a control system of a management apparatus 200 according to the present embodiment. A CPU 201 in the form of a microprocessor operates in accordance with a program memory 202 in the form of a ROM connected via an internal bus and the contents of a data memory 203 in the form of a RAM connected via an internal bus. A data memory 203 is a work memory used by CPU 201 when executing a control program. The data memory 203 is used for storing a user management table 204 (also referred to as user management information) for managing a correspondence between user information and function restriction information as illustrated in FIG. 5 and is used for a job storage area 205 for temporarily storing print data. The user management table 204 and the job storage area 205 may be stored in a nonvolatile semiconductor memory, a hard disk, or the like. The CPU 201 controls a network controller 206 and can communicate with other apparatuses connected in a communication network. Thus, the management apparatus 200 can receive user information from the authentication apparatus 300, receive the job data from the information processing apparatus 400, and send the job data to the image forming apparatus 100. Of course, it is also possible to transmit or receive data in the opposite directions.

FIG. 5 illustrates an example of the user management table 204. In this example, function restriction information indicating availability of print, copy, and scan functions in association with the identification information of two users, user A and user B, is registered in the user management table 204. For example, user A is allowed to use all functions, but user B is only allowed to copy and is not allowed to use other functions. The functions subject to restriction are not limited to the three illustrated functions, and may include other functions such as a function for storing or deleting print data, a function of transmitting facsimile, for example, or max be limited to one function or two functions.

Figure 6:
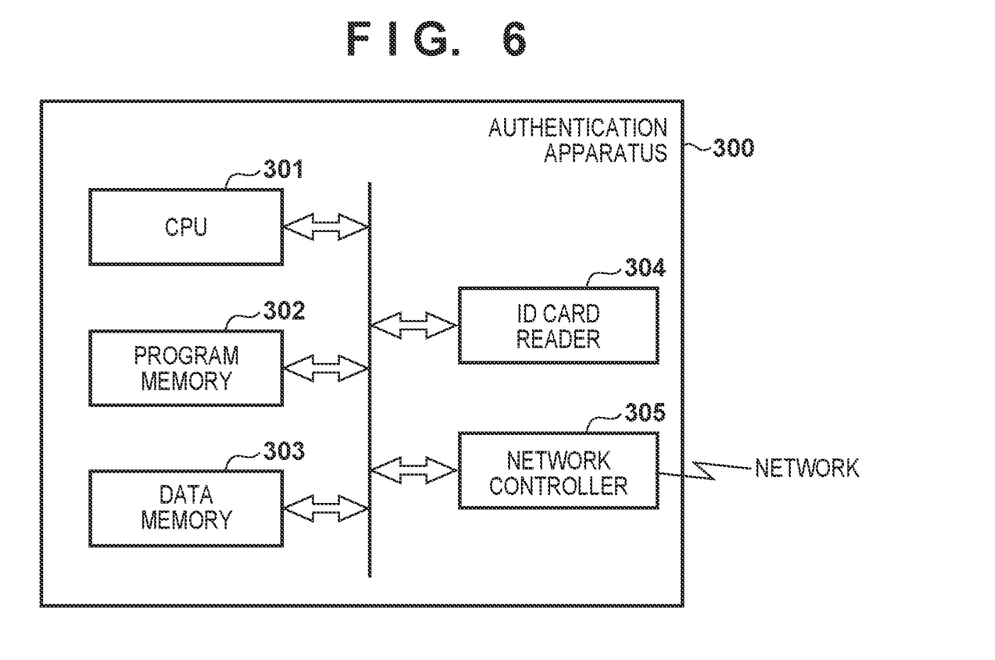
FIG. 6 is a block diagram illustrating a configuration of a control system of an authentication apparatus 300.

FIG. 6 is a block diagram illustrating a configuration of a control system of the authentication apparatus 300 according to the present embodiment. A CPU 301 in the form of a microprocessor operates in accordance with a program memory 302 in the form of a ROM connected via an internal bus and the contents of a data memory 303 in the form of a RAM connected via an internal bus. The CPU 301 controls an ID card reader 304 to read user information recorded on an ID card when the ID card is held over the ID card reader 304. For example, user information including identification information unique to a respective user is recorded in the ID card. The CPU 301 controls the network controller 305 and can communicate with other apparatuses connected in a communication network. Thereby, the authentication apparatus 300 can send the user information read by the ID card reader 304 to the management apparatus 200 via the network.

Procedure for Managing the use of the Image Forming Apparatus

Figure 7:
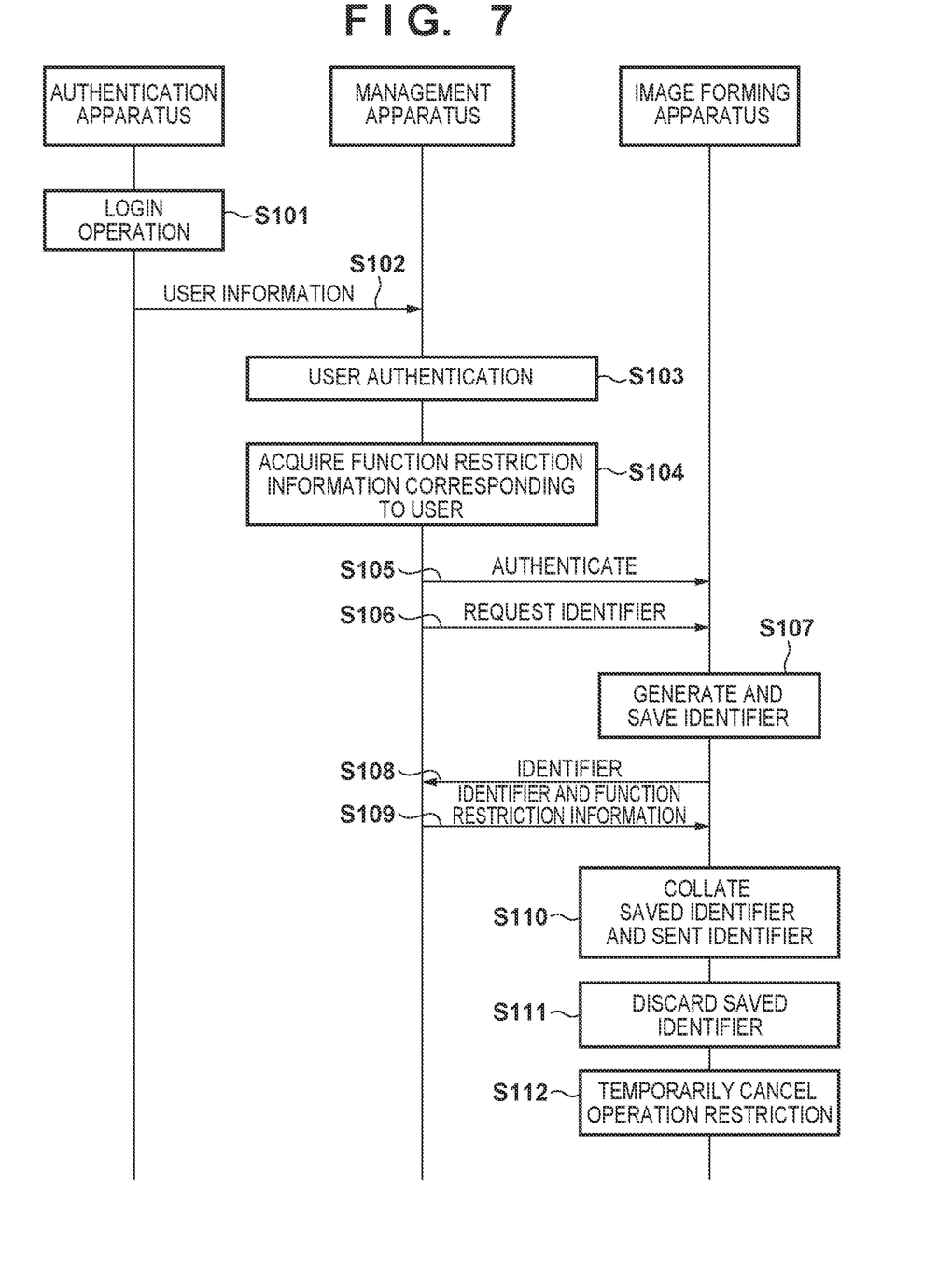
FIG. 7 is a flowchart of cancellation of a function restriction described in the first embodiment.

FIG. 7 is a flowchart relating to the control of the image forming apparatus 100 and peripheral devices thereof according to the present embodiment.

In step S101, a user holds an ID card over the ID card reader 304 of the authentication apparatus 300 and allows the authentication apparatus 300 to read the user information recorded therein. By that operation, in step S102, the authentication apparatus 300 transmits the user information read from the ID card to the management apparatus 200. The authentication apparatus 300 is not limited to the user information recorded on the ID card, and may acquire user information for uniquely identifying a user using biometric authentication such as facial authentication or fingerprint authentication, for example, or other methods or means for identifying the user, and transmit the user information to the management apparatus 200.

In step S103, the management apparatus 200 verifies whether the user information transmitted from the authentication apparatus 300 is registered in the user management table 204. When the user information is registered, the function restriction information corresponding to the user information is acquired from the user management table 204 in step S104. When the user information is not registered, the user does not have the operation authority of the image forming apparatus 100, and thus the process is terminated. The function restriction information may be registered for each image forming apparatus. In this case, the identification information of the selected image forming apparatus may be received from the authentication apparatus 300 together with the user information, and the function restriction information associated with the user information may be acquired for the corresponding image forming apparatus.

Authentication for confirming that the image forming apparatus 100 and the management apparatus 200 are authentic is performed in step S105. In the present embodiment, challenge/response authentication is used, but other means may be used.

When the authentication is accepted, that is, when the authentication is successful, the management apparatus 200 requests an identifier from the image forming apparatus 100 in step S106. The image forming apparatus 100 generates an identifier in step S107 and stores it in the data memory 114. As the identifier, a random value is generated, but other methods such as generating a hash function based on the unique value of the image forming apparatus 100 or the like may be used.

The generated identifier is encrypted and transmitted from the image forming apparatus 100 to the management apparatus 200 in step S108. The encryption method uses symmetric key encryption that encrypts using an encryption key shared between the image forming apparatus 100 and the management apparatus 200 in advance, but other encryption methods may be used.

The management apparatus 200 decrypts the received encrypted identifier and, in step S109, transmits a request for cancellation of the operation restriction together with the decrypted identifier and the function restriction information to the image forming apparatus 100. As the function restriction information, a format determined in advance between the image forming apparatus 100 and the management apparatus 200 is used. For example, when copying and scanning are permitted, a format listing the function names "copy, scan" may be used.

In step S110, the image forming apparatus 100 determines whether or not the received identifier matches the identifier stored in the data memory 114. If they match, the identifier stored in the data memory 114 is discarded (or erased) in step S111, and the operation restriction is temporarily canceled in accordance with the function restriction information received together with the identifier in step S112. If they do not match, the management apparatus 200 may transmit something to the effect that the request for cancellation of the operation restriction is rejected, or may simply terminate the process. In addition, the Operation restriction cancel request may be similarly dealt with when the operation restriction has already been cancelled by a user. Also in these cases, an identifier stored in the data memory 114 is erased. The identifier stored in the data memory 114 is discarded by the image forming apparatus 100 even when a fixed time has elapsed since it was generated. The operation restriction may be a state in which a lock screen is displayed on the operation panel 125 of this example and in which operation is impossible. That is, in step S112, the image forming apparatus 100 transitions from a state in which it cannot be operated at all (a display state of the lock screen) to a state in which the function allowed by the function restriction information can be used.

Control by the Image Forming Apparatus

Next, control for when the image forming apparatus 100 receives the function restriction information and restricts the corresponding function will be described. First, in order to restrict the operation of the operation panel 125 which is for operating the image forming apparatus 100, an operation restriction instruction is executed by the user. This instruction may be given, for example, by an administrator user who manages the image forming apparatus 100 at the time of installation of the image forming apparatus 100 or the like.

Figure 8:
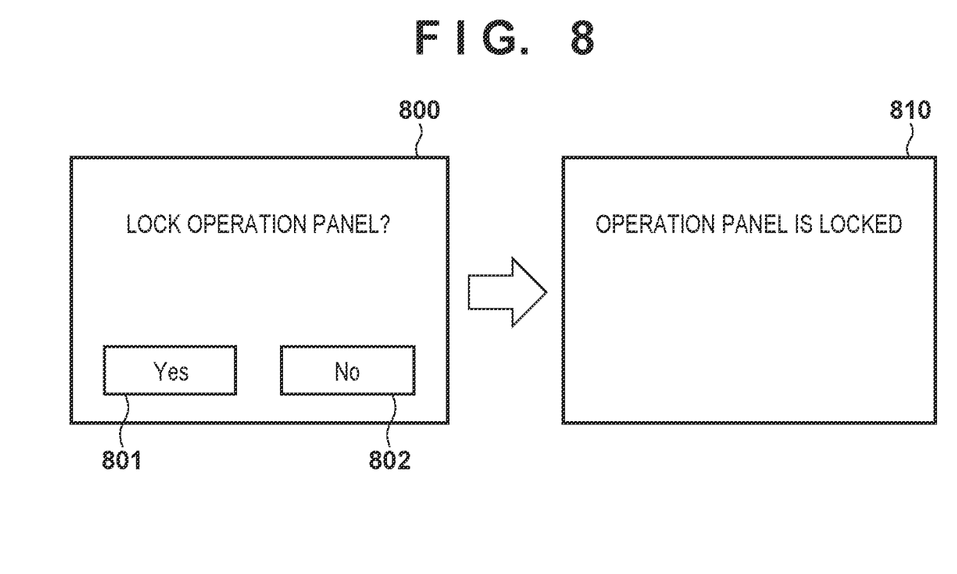
FIG. 8 is a diagram illustrating an example of a screen for when an operation restriction is applied on the operation panel described in the first embodiment.

FIG. 8 is an example of when operation of the operation panel 125 of the image forming apparatus 100 is restricted. The user can touch either a button 801 or a button 802 on a screen 800 for selecting whether or not to lock the operation panel. When the user touches the YES button 801, the display content of the operation panel 125 is fixed to a lock screen 810, and a state in which operation is impossible is transitioned into. Here, restriction of operation of the operation panel 125 is realized by enabling a corresponding setting of the image forming apparatus 100 (that is, a lock of the operation panel), but other methods may be adopted. For example, setting may be performed from a computer connected via a communication network. When the NO button 802 is touched on the screen 800, operation of the operation panel 125 is not restricted, and for example, a user interface permitting an operation without restriction, for example, the screen 1120 of FIG. 11 may be displayed on the operation panel 125.

Figure 9:
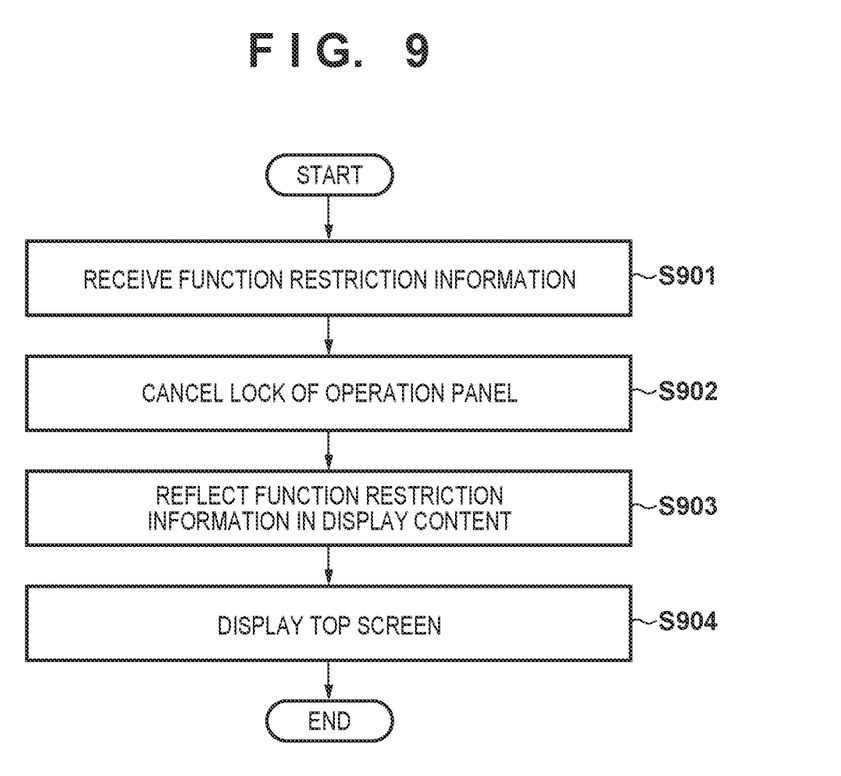
FIG. 9 is a flowchart illustrating control of an operation panel display process described in the first embodiment

FIG. 9 is a flowchart illustrating an outline of an operation panel display process in the present embodiment. At the start of this procedure, the image forming apparatus 100 is in an operation restriction state. This process is executed by the CPU 111 of the image forming apparatus 100.

The CPU 111 communicates with the external management apparatus 200 via the network in step S901, and receives function restriction information which can be specified for each function of the image forming apparatus 100. The operation restriction of the operation panel 125 is temporarily cancelled in step S902. "Temporarily" may mean until the execution of a function that is used after the cancellation the operation restriction is aborted or completed. Thereafter, in step S903, the display content in the operation panel 125 is changed so that only the function specified by the function restriction information can be operated by the operation panel 125, and the changed display content in step S904 is displayed as a top screen. From step S902 to step S904, configuration may be such that operation on the operation panel 125 is not be accepted.

As described above, a function for which a trigger is inputted from the image forming apparatus 100 can be restricted by locking the operation panel 125 or changing the user interface. Meanwhile, the use or execution of a function for which an instruction is given from an external apparatus and for which an operation on the operation panel 125 is not a trigger may be permitted or prohibited in accordance with function restriction information. For example, a print function for receiving and executing a print job from a connected information processing apparatus does not involve an operation of the operation panel 125. For such a function, if the function is restricted or the image forming apparatus is locked, even if a print job is received, it may be discarded and a response indicating this may be returned to the transmission source of the print job.

Alternatively, when the operation panel 125 of the image forming apparatus 100 is locked, for example, a message indicating that the print function cannot be used may be broadcast to the network directly or via the management apparatus 200. In this case, the apparatus on the network does not transmit the print job to the image forming apparatus 100 until the message that allows the login user to use the print function is received from the image forming apparatus 100. If the use of the print function by the login user is permitted by the function restriction information of the user, the image forming apparatus 100 or the management apparatus 200 may transmit a message allowing use of the print function to the information processing apparatus on which the user is logged in. Alternatively, there may be no restriction on the use of functions, such as print functions, from the external apparatus regardless of the settings made in the user management table. In this case, the functions to be restricted are limited to functions launched from the operation panel so function restrictions can be realized simply by locking the operation panel or changing the user interface.

Further, even if an operation restriction (that is a lock state) of the operation panel is cancelled and the top screen is displayed, if a fixed time elapses during which a job (for example, scanning or copying) has not been executed, the lock screen may be displayed again to restrict the operation. In this case, the fixed time may be a predetermined fixed time or may be a time separately specified by the user.

Figure 10A:
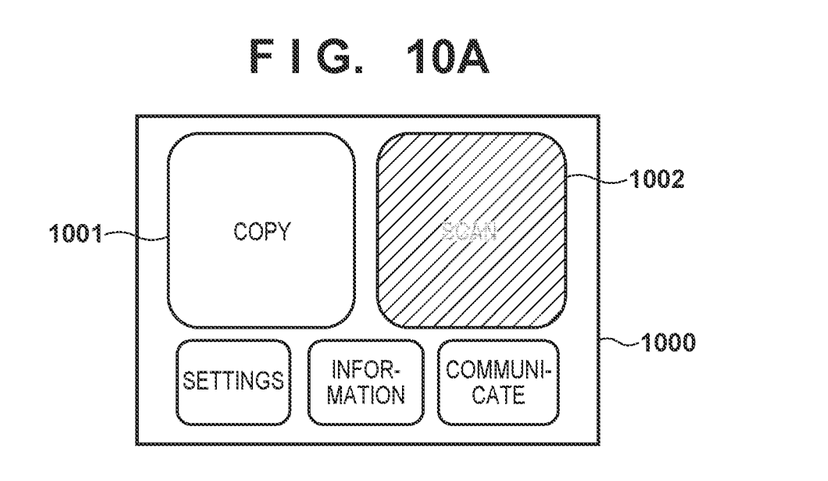
FIG. 10A, FIG. 10B, and FIG. 10C are diagrams illustrating an example of displays of the operation panel representing restrictions of functions described in the first embodiment
Figure 10B:
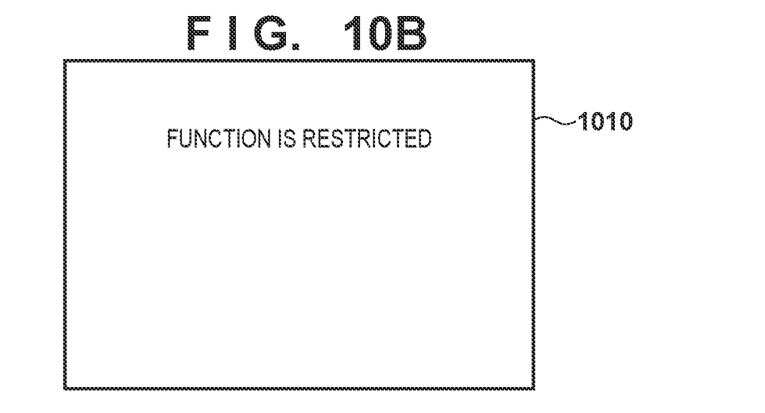

FIG. 10A to FIG. 10C are exemplary displays of the operation panel 125 indicating the restrictions on functionality. FIG. 10A is an exemplary top screen 1000 when copying is permitted and scanning is prohibited. The function icon 1001 of the permitted copy function is not changed from what it normally is, and the function icon 1002 of the prohibited scan function is grayed out. If copy is selected, the copy function can be used as normal. On the other hand, even if an icon 1002 is touched and scan is selected, touches to the grayed-out icon are ignored and so the corresponding scan function cannot be used, and a warning screen 1010 illustrated in FIG. 10B is displayed. The warning screen 1010 displays a message indicating that the selected function is restricted and unavailable. That is, the top screen 1000 may be a function instruction user interface for instructing functions used by the user, or it may be a user interface with function restrictions.

Figure 10C:
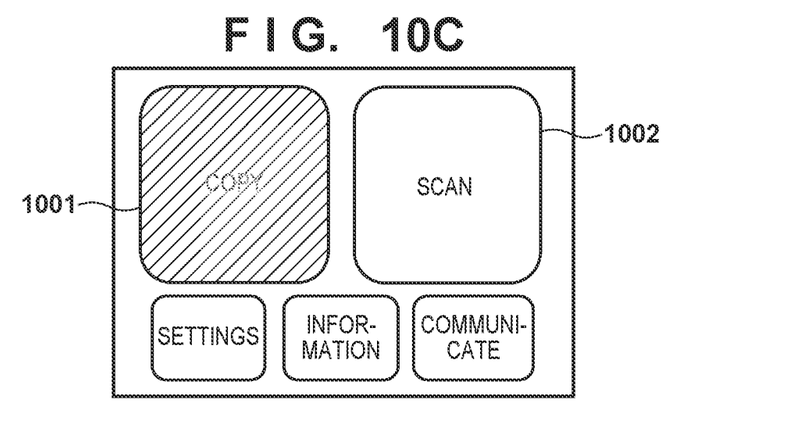

FIG. 10C is an example of receiving the function restriction information of another pattern. The screen in this example illustrates an example where copying is prohibited and scanning is permitted. As in the previously-described example, the function icon 1001 of the prohibited copy function is grayed out, and even if it is selected, a warning screen is displayed and the function cannot be used. Here, in the present embodiment, measures are taken so that the user can understand that the use of the function is prohibited. In other words, the function icon is grayed out or a warning screen is displayed at the time of selection, but other methods of representing this are possible, and the apparatus may be configured to not operate even when the function is selected even without notifying the user.

By implementing the above configuration, the function can be restricted in accordance with the received function restriction information, Therefore, it is possible to control the permission to use the functions of the image forming apparatus for each user without having the user management function inside the main body and without depending on the external authentication apparatus.

Modification of First Embodiment

The user interface can restrict a pull-print function of specifying, on the operation panel 125, print data that is stored in the image forming apparatus 100 or the network-connected server and printing it. For example, an icon for printing is added to the screen 1000, and when the icon is selected, the image forming apparatus 100 displays a user interface for specifying the printing data to be printed. In such a configuration, in step S112 of FIG. 7, if the print function is restricted in the received function restriction information, the icon for printing may be displayed to be grayed out. In this way, it is possible to realize the restriction of a function by the user interface for the printing function in accordance with the function restriction information.

Second Embodiment

In the first embodiment, the external management apparatus 200 communicates via the network and receives the function restriction information which can be specified for each function of the image forming apparatus 100, but configuration may be such that an operation restriction state can be cancelled with an administrator authority in the local environment so as to make it possible to use a function.

Figure 11:
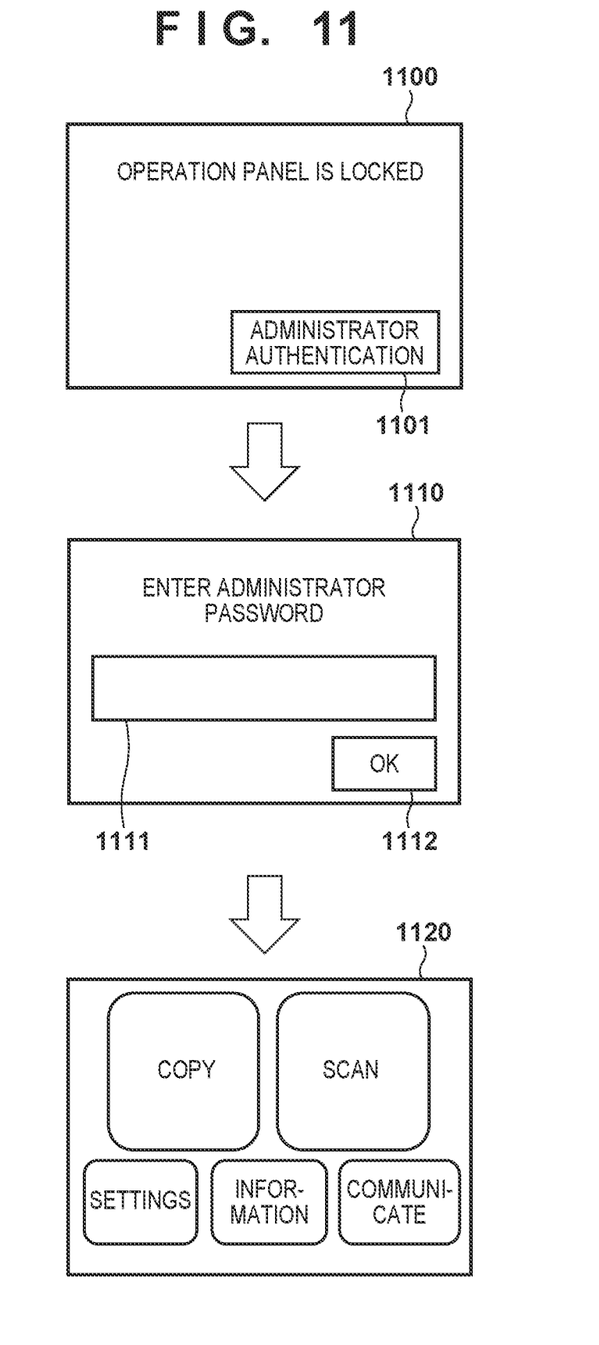
FIG. 11 is a diagram illustrating an example of an operation restriction cancellation operation employing a manager authentication described in a second embodiment

FIG. 11 illustrates the operation of canceling the operation restriction using administrator authentication. A function button 1101 for performing administrator authentication is provided on a display screen 1100 in which the operation of the operation panel 125 is restricted. When the function button 1101 is touched, a screen 1110 for the user to input a corresponding password is displayed. In this screen, a password is entered in an input field 1111 and an OK button 1112 is touched to authenticate the entered password; if successful, the operation restriction is temporarily canceled. In this case, the password of the administrator is registered in the image forming apparatus 100 in advance.

When the operation restriction is cancelled by the administrator, the available functions are not restricted, and a screen 1120 is displayed on the operation panel 125, which is a user interface through which all functions are available. In addition, while the administrator has cancelled the operation restriction, requests for cancellation of the function restriction from the network are rejected. For example, even if there is a cancel request from the management apparatus 200, a rejection response is returned. A cancel request may include, for example, a request for an identifier in step S106 and a request for cancellation of the operation restriction in step S109. This restricts (or prohibits) any use by users other than the administrator. "Temporarily" may mean until the execution of a function that is used after the cancellation the operation restriction is aborted or completed.

By doing so, the administrator can unrestrictedly use the function by a simple procedure of directly operating the operation panel 125 of the image forming apparatus 100, and thus the convenience can be improved. On the other hand, users other than the administrator can be allowed to use the function in accordance with the function restrictions determined for each user, as described in first embodiment.

Third Embodiment

Figure 12:
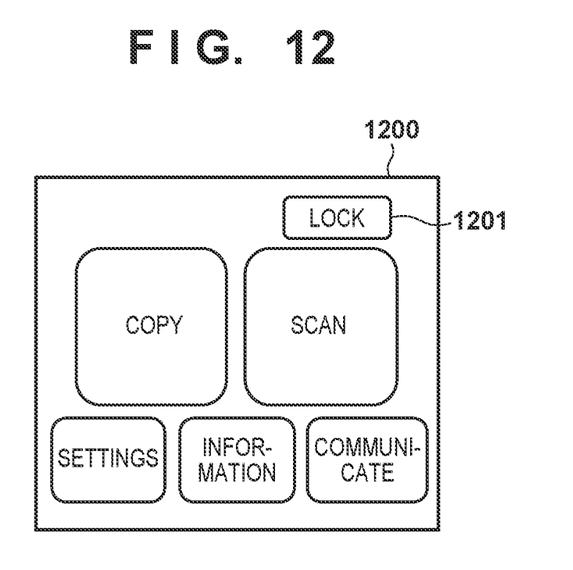
FIG. 12 is a diagram illustrating an example of a display for again realizing an operation restriction by a user operation illustrated in a third embodiment.

In the second embodiment, an operation of temporarily cancelling an operation restriction of the operation panel 125 was described; it is possible to provide a function that thereafter imposes the restriction again. FIG. 12 is an example of a display for implementing a re-restriction by user operation. Here, by selecting the re-restriction function button 1201 provided on the screen 1200 of the operation panel 125, the screen of the operation panel 125 can be re-set to the screen 1100 illustrated in FIG. 11, for example, to restrict the operation. The re-restriction of the operation may be automatically performed upon the lapse of a predetermined period of time without the user touching the function button 1201. For example, when the user does not operate the operation panel 125 and a predetermined time has elapsed in a state where an operation such as printing is not performed, the operation of the operation panel 125 is automatically restricted. The user may arbitrarily set a time until re-restriction. The re-restriction process may be executed in accordance with an instruction (a lock instruction) from the management apparatus 200.

This makes it possible to return an image forming apparatus which has become available for unrestricted use by the administrator to a state in which an operation restriction is imposed again. Thereby, even after the administrator has used the function, it is possible to manage the allowed functions for each user.

Fourth Embodiment

The first embodiment targets changes in function restriction of the operation panel 125, but it can also be used for the restriction of printing by the user. Although restriction of the print function has been briefly described in the first embodiment, another method will be described in more detail in this embodiment.

Figure 13:
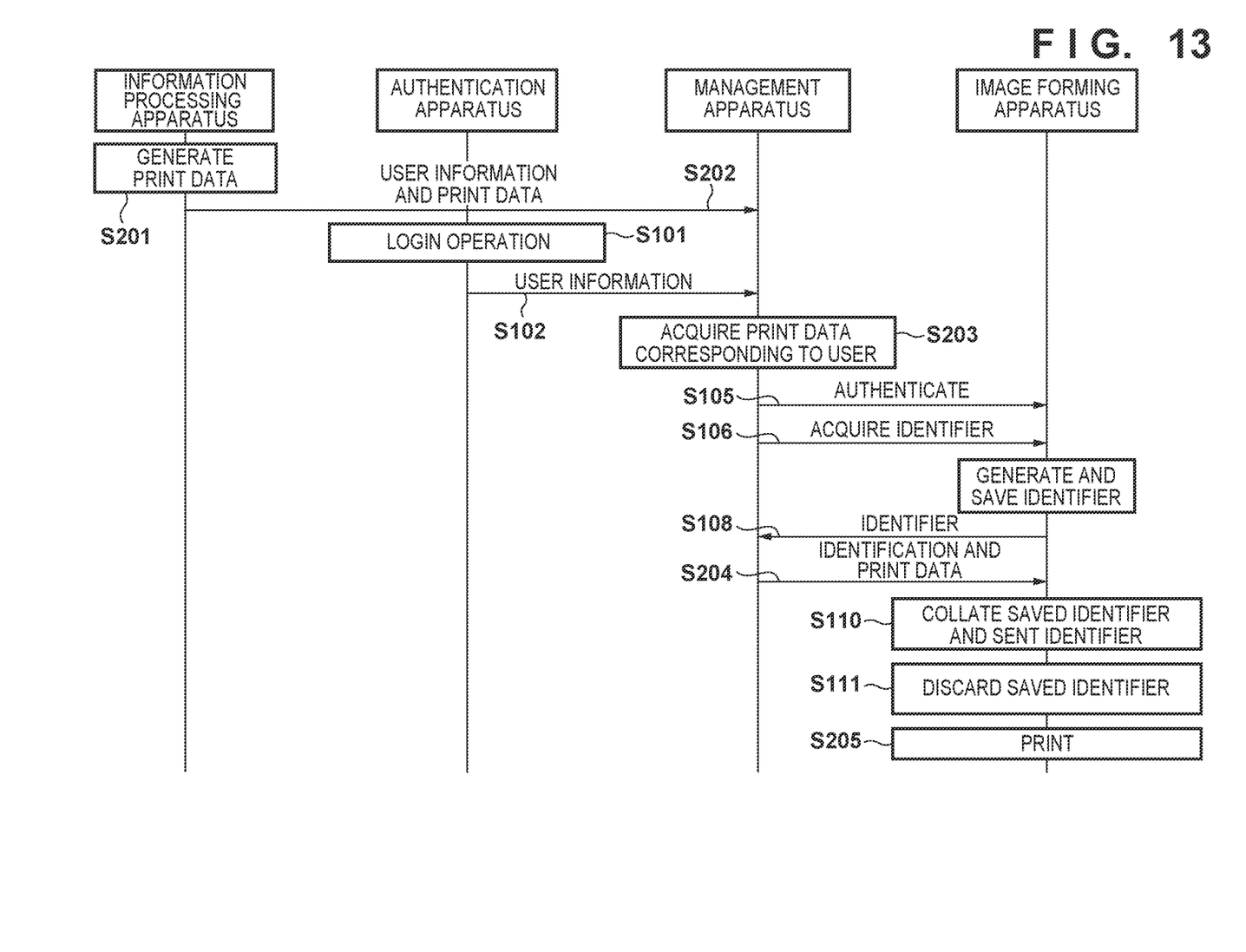
FIG. 13 is a diagram illustrating an example of a sequence for when performing printing described in a fourth embodiment.

FIG. 13 illustrates an example of a sequence for when printing by the image forming apparatus 100 is performed from the information processing apparatus 400.

In step S201, when the user inputs a print instruction of data created by, for example, an application in the information processing apparatus 400, the information processing apparatus 400 generates print data. Then, in step S202, the information processing apparatus 400 transmits the user information and the print data to the management apparatus 200. The user information sent includes identification information of the user. The management apparatus 200 stores the received print data and the user information in association with each other.

In step S101, the user causes the user information to be read, such as by holding the ID card over the authentication apparatus 300. Triggered by that operation, in step S102, the authentication apparatus 300 transmits the user information read from the ID card to the management apparatus 200.

In step S203, the management apparatus 200 acquires print data corresponding to the authenticated user. The print data is acquired by being received, for example, from the information processing apparatus as in step S202, and the print data stored in association with the user information is targeted. If multiple print data associated with the same user are stored, all of them may be retrieved. Alternatively, the oldest one or one for which priority processing is specified may be acquired. If the corresponding print data does not exist, the process is suspended. In addition, prior to step S203, a process of confirming that the user authenticated in step S101 is a user registered in the management apparatus 200 may be performed.

In step S105, authentication for confirming that the image forming apparatus 100 and the management apparatus 200 are legitimate is performed, and when the authentication has been accepted, the management apparatus 200 requests an identifier from the image forming apparatus 100 in step S106. The image forming apparatus 100, in step S107, generates an identifier and stores it in the data memory 114.

Then, the generated identifier is encrypted and transmitted from the image forming apparatus 100 to the management apparatus 200 in step S108.

The management apparatus 200 decrypts the received encrypted identifier and, in step S109, in step S204 transmits the decrypted identifier and the print data acquired in step S203 to the image forming apparatus 100.

In step S110, the image forming apparatus 100 determines whether or not the received identifier matches the identifier stored in the data memory 114. If they match, the identifier stored in the data memory 114 is discarded in step S111 and printing is performed in step S205.

In the above procedure, for example, in step S203, the management data 200 may acquire the function restriction information of the logged-in user from the user management table prior to acquiring the print data. If the user refers to the authority of the login user and the print function of the image forming apparatus 100 is restricted, for example, a response to that effect may be returned to the authentication apparatus 200, and the process may be terminated without transmitting the print data to the image forming apparatus 100. On the other hand, if the printing function is permitted, the corresponding print data may be acquired and the processing after step S105 may be executed.

By doing so, even when the print function of the image forming apparatus 100 is used from an external apparatus, a function restriction according to the function restriction information can be performed.

Fifth Embodiment

When complicated user management is not required, the authentication apparatus 300 and the image forming apparatus 100 may be directly connected to each other. In this case, the authentication apparatus 300 may transmit function restriction information for permitting copying to the image forming apparatus 100, for example, when a user supplies a predetermined fee.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-206042, filed Dec. 11, 2020, which is hereby incorporated by reference herein in its entirety.

What is claimed is:

1. An image forming apparatus operable to provide at least one function, the apparatus comprising:
   an operation unit configured to accept an operation by a user via a displayed user interface; and
   a controller,
   wherein
   the controller comprises
   one or more processors and one or more memory comprising one or more programs, wherein the one or more programs are configured to cause the one or more processors to:
   in a case where authentication by a management apparatus succeeds, generate an identifier in response to a request for an identifier, store the identifier generated and transmit to the management apparatus the identifier generated;
   receive the function restriction information with the identifier from the management apparatus; and
   in a case where the received identifier corresponds to the transmitted identifier, discard the identifier stored, and display on the operation unit the user interface in accordance with the function restriction information indicating availability of each of the at least one function, wherein
   based on the function restriction information, a user interface that accepts an instruction for using a function for which usage is permitted and does not accept an instruction for using a function for which usage is restricted is displayed on the operation unit.

2. The image forming apparatus according to claim 1, wherein the one or more programs are configured to cause the one or more processors to:
   display, on the operation unit, a lock screen that does not accept an instruction to use any of the functions in accordance with an operation by a user, and display, on the operation unit, the user interface in accordance with a reception of the function restriction information from the management apparatus.

3. The image forming apparatus according to claim 2, wherein the one or more programs are configured to cause the one or more processors to,
   in a case where an authentication of an administrator is accepted on the lock screen, and the authentication of the administrator succeeds, display the user interface so as to permit usage for all of the at least one function.

4. The image forming apparatus according to claim 2, wherein the one or more programs are configured to cause the one or more processors to,
   after displaying the user interface, when a fixed time has elapsed in a state in which a job has not been executed, again display the lock screen.

5. The image forming apparatus according to claim 4, wherein
   the fixed time is set by a user.

6. The image forming apparatus according to claim 2, wherein the one or more programs are configured to cause the one or more processors to
   display the lock screen in accordance with a reception of a lock instruction from the management apparatus.

7. The image forming apparatus according to claim 1, wherein
   the function restriction information includes information indicating availability of at least one of a copy function, a scan function, a facsimile transmission function, and a printing function.

8. A non-transitory computer-readable recording medium that has recorded thereon a program for causing a processor of an image forming apparatus operable to provide at least one function, and having an operation unit for accepting an operation by a user via a displayed user interface, to:
   in a case where authentication by a management apparatus succeeds, generate an identifier in response to a request for an identifier, store the identifier generated and transmit to the management apparatus the identifier generated;
   receive the function restriction information with the identifier from the management apparatus; and
   in a case where the received identifier corresponds to the transmitted identifier, discard the identifier stored, and display on the operation unit the user interface in accordance with the function restriction information indicating availability of each of the at least one function, wherein
   based on the function restriction information a user interface that accepts an instruction for using a function for which usage is permitted and does not accept an instruction for using a function for which usage is restricted, is displayed on the operation unit.

9. An image forming system comprising:
   an image forming apparatus operable to provide at least one function; and
   a management apparatus configured to transmit to the image forming apparatus the function restriction information corresponding to an authenticated user,
   wherein
   the image forming apparatus comprises:
   an operation unit configured to accept an operation by a user via a displayed user interface; and
   a controller,
   wherein
   the controller comprises
   one or more processors and one or more memory comprising one or more programs, wherein the one or more programs are configured to cause the one or more processors to:
   in a case where authentication by the management apparatus succeeds, generate an identifier in response to a request for an identifier, store the identifier generated and transmit to the management apparatus the identifier generated;
   receive the function restriction information with the identifier from the management apparatus; and
   in a case where the received identifier corresponds to the transmitted identifier, discard the identifier stored, and display on the operation unit the user interface in accordance with the function restriction information indicating availability of each of the at least one function, wherein
   based on the function restriction information, a user interface that accepts an instruction for using a function for which usage is permitted and does not accept an instruction for using a function for which usage is restricted is displayed on the operation unit.

10. A method for controlling an image forming apparatus operable to provide at least one function, and having an operation unit for accepting an operation by a user via a displayed user interface, comprising:
- in a case where authentication by a management apparatus succeeds, generating an identifier in response to a request for an identifier, storing the identifier generated and transmitting to the management apparatus the identifier generated;
- receiving the function restriction information with the identifier from the management apparatus; and
- in a case where the received identifier corresponds to the transmitted identifier, discarding the identifier stored, and displaying on the operation unit the user interface in accordance with the function restriction information indicating availability of each of the at least one function, wherein
- based on the function restriction information a user interface that accepts an instruction for using a function for which usage is permitted and does not accept an instruction for using a function for which usage is restricted is displayed on the operation unit.

* * * * *